Figure 1:
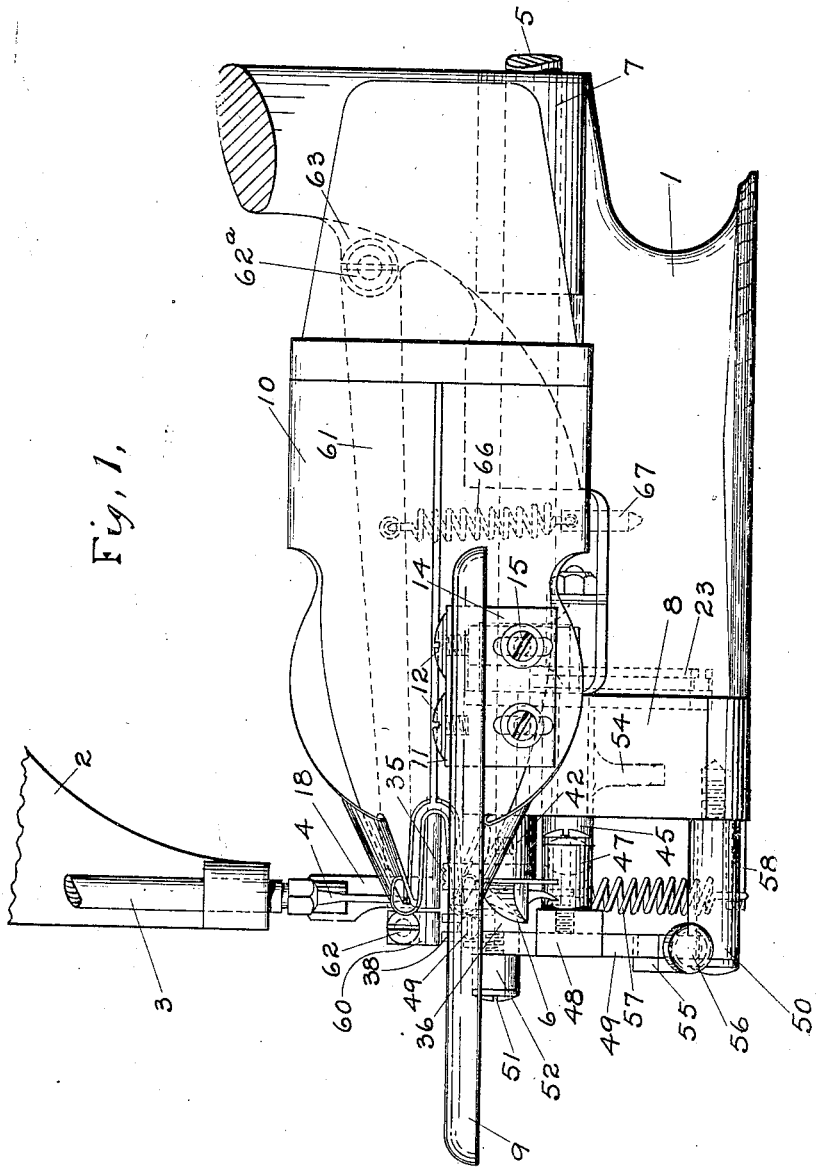

J. P. WEIS.
CONVERTIBLE RUFFLING AND COLLARET SEWING MACHINE.
APPLICATION FILED JULY 6, 1906.

1,069,363.

Patented Aug. 5, 1913.

6 SHEETS—SHEET 1.

WITNESSES:
Willis C. Robbins.
Louis Krug.

INVENTOR:
John P. Weis.
BY
Brack & Suffman
ATTORNEYS.

J. P. WEIS.
CONVERTIBLE RUFFLING AND COLLARET SEWING MACHINE.
APPLICATION FILED JULY 6, 1906.

1,069,363. Patented Aug. 5, 1913.
6 SHEETS—SHEET 2.

WITNESSES:
Willis C. Robbins.
Louis Krug.

INVENTOR
John P. Weis.
BY
Brock & Chapman
ATTORNEYS.

J. P. WEIS.
CONVERTIBLE RUFFLING AND COLLARET SEWING MACHINE.
APPLICATION FILED JULY 6, 1906.
1,069,363.
Patented Aug. 5, 1913.
6 SHEETS—SHEET 3.
Fig. 4,
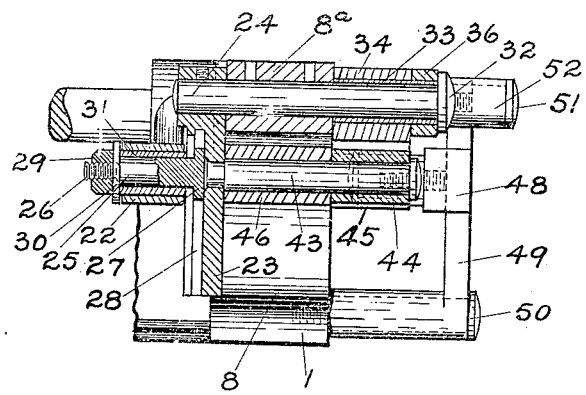
Fig. 5,
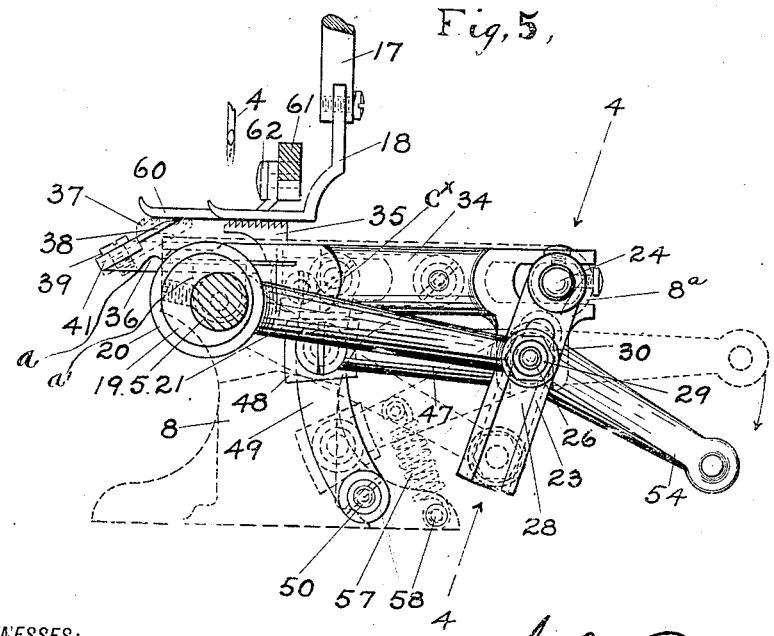
WITNESSES:
Willis C. Robbins.
Louis Krug
INVENTOR:
John P. Weis.
Buck E. W. Chapman
ATTORNEYS.

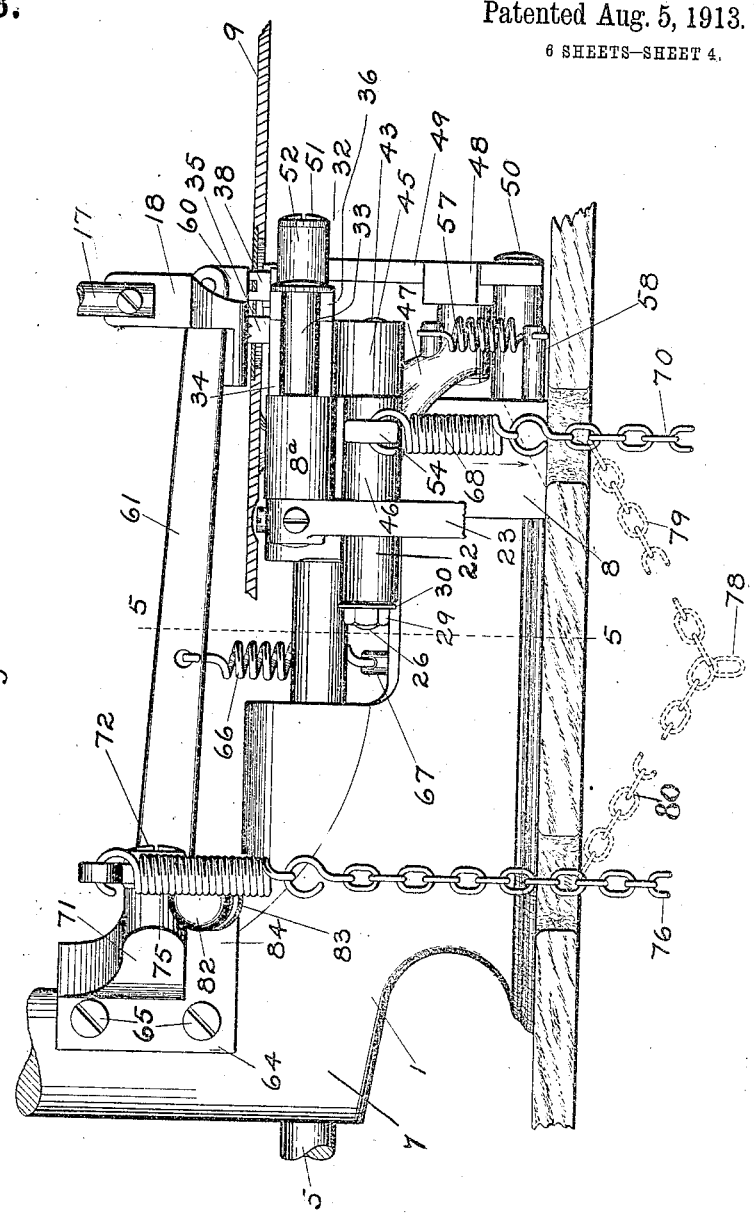

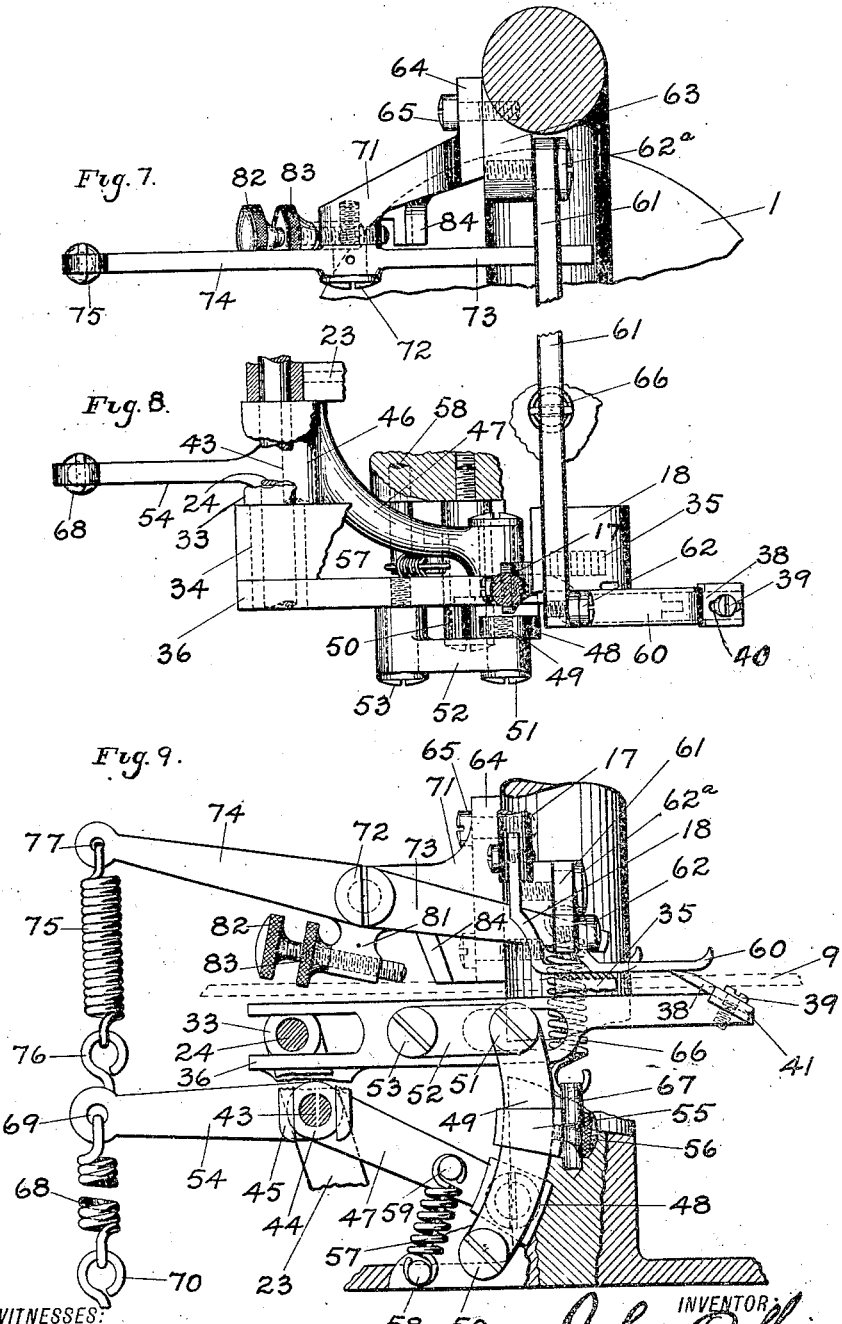

J. P. WEIS.
CONVERTIBLE RUFFLING AND COLLARET SEWING MACHINE.
APPLICATION FILED JULY 6, 1906.
1,069,363.
Patented Aug. 5, 1913.
6 SHEETS—SHEET 6.
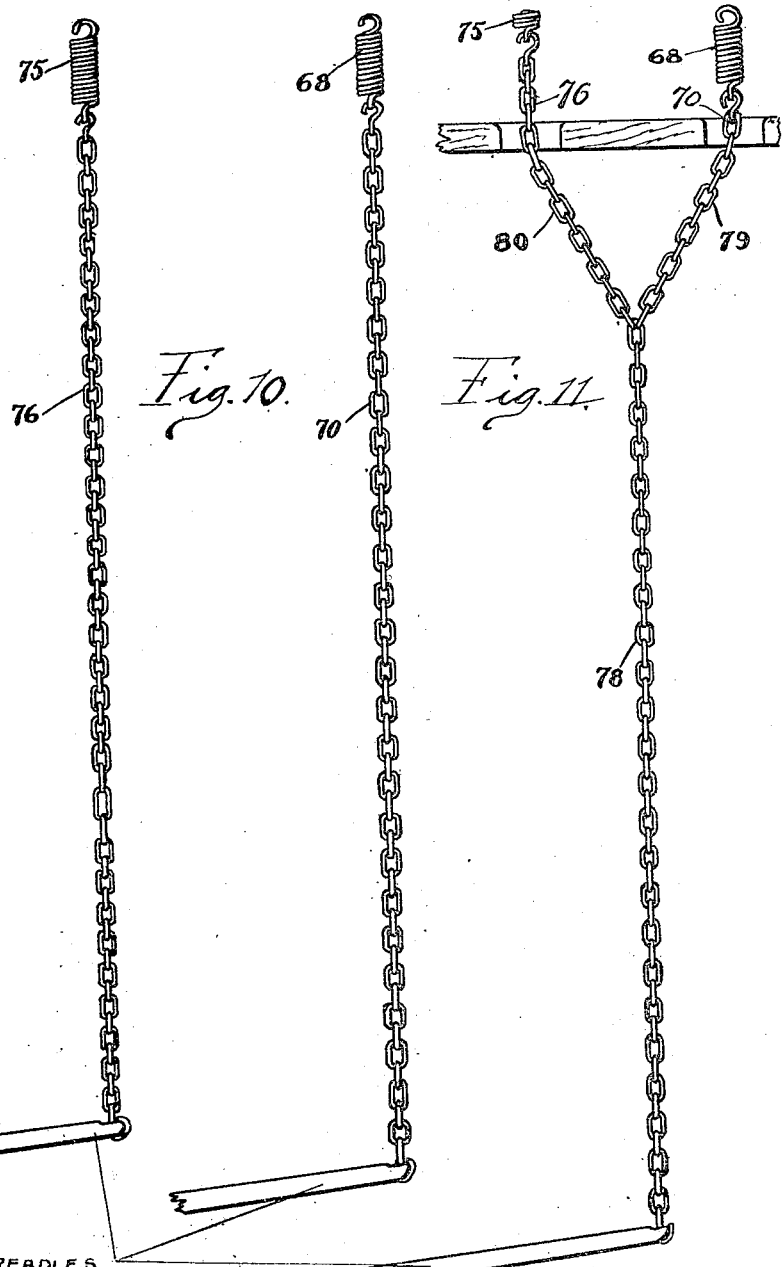

UNITED STATES PATENT OFFICE.

JOHN P. WEIS, OF NYACK, NEW YORK, ASSIGNOR TO METROPOLITAN SEWING MACHINE COMPANY, OF NYACK, NEW YORK, A CORPORATION OF NEW YORK.

CONVERTIBLE RUFFLING AND COLLARET-SEWING MACHINE.

1,069,365.  Specification of Letters Patent.  Patented Aug. 5, 1913.

Application filed July 6, 1906. Serial No. 324,970.

*To all whom it may concern:*

Be it known that I, JOHN P. WEIS, a citizen of the United States, residing at Nyack, county of Rockland, and State of New York, have invented a new and useful Improvement in Convertible Ruffling and Collaret-Sewing Machines, of which the following is a specification.

This invention relates to sewing machines and, particularly, to a machine which may be used either as a machine for ruffling, gathering, folding or plaiting the work, or as a machine for fulling, or stretching the work. Hence, the invention relates to a convertible machine capable of performing the work ordinarily accomplished by the "back-ruffling machine" of the Union Special Machine Company, together with all kinds of ruffling work on one or more pieces of fabric, and also the work accomplished by the "collaret machine" of the Metropolitan Sewing Machine Company.

Among the objects of my invention may be noted the following: to provide a machine by means of which two radically different classes of work may be performed, viz., (1) the material and substantial ruffling, gathering, shirring and plaiting of all classes of goods, such as knit goods, white goods, silks and all kinds of light and sleazy materials, as well as light-weight stiff materials, such as leather, buckram, etc., and (2) the fulling or stretching of all kinds of elastic or stretchy fabrics; to provide a machine by means of which collarets may be applied to French Balbriggan shirts, as on the well-known Metropolitan collaret machine, and all kinds of binding may be applied to work; to provide a convertible machine on which collaret and other similar work or binding may be done, as well as ruffling, gathering, shirring and plaiting materials as above referred to; to provide means for regulating the throw of the ruffler device relatively to the feed of the machine while the latter is in operation without stopping, retarding, or otherwise affecting the stitching operation; to provide means whereby either the ruffling device or the auxiliary feed may be always under the control of the operator, and the controlling means accessibly presented to the operator so that the same may be manipulated at full speed of the machine and without affecting the stitching thereof in any particular; to provide means by which the character of the work performed may be controlled, and be under the control of the operator during the running of the machine, and by either regulating the throw of the ruffler-device, or the auxiliary feed, or by regulating the pressure of the member, or foot, which coöperates with the ruffling-device or auxiliary feed upon the work; to provide means by which ruffling, plaiting, shirring, gathering, fulling or stretching, may be produced in varying degrees at the will of the operator, and such work, or effects, caused to alternate with plain portions of work during the operation of the machine and irrespective of the speed of the latter; to provide a machine with means by which a given or predetermined length of ruffling, shirring, gathering or plaiting may be produced or for any desired period, and by which such predetermined length of ruffling, etc., may be completely eliminated instantly for any desired period and then reproduced instantly for any desired period uch means being under the control of the operator and operable during the running of the machine and without affecting the stitching irrespective of the speed of the machine; to provide means by which after the machine has been set for a predetermined maximum ruffle, etc., gradual decrease from or increase to said maximum ruffle, etc., may be produced at the will of the operator and without affecting the stitching irrespective of the speed of the machine; to provide a machine, for producing ruffling, gathering, shirring, plaiting, stretching and fulling, with means whereby the character of the work may be controlled by manipulating either one of two devices and with means for connecting said two devices so that they may both be operated simultaneously, or substantially so, or independent of one another should it be so desired, said means and devices being at all times accessibly presented to the operator and under his complete control, so as to bring about the desired results and functions during the operation of the machine and without affecting the stitching thereof; to provide means whereby the presser-device, which coöperates with the ruffler-blade or auxiliary feed, may be set in a given position, for a normal and uniform operation of the machine and for a predetermined pressure in coöperation with said ruffling device or auxiliary feed, without affecting the controlling means for manipulating the ruffling device or auxiliary feed, either of which latter, under such conditions, may be manipulated to vary its stroke during the operation of the machine and without affecting the stitching of the latter, and without disturbing or in any manner affecting the said presser-device as set or adjusted; to provide means whereby, even though the said presser-device be set in fixed position for a uniform, normal operation as above described, in coöperation with either the ruffling device or the auxiliary feed, pressure upon the work may be relieved or regulated by manipulating the said device independently of its controlling lever or lifter; to provide means whereby, if it should be found desirable, and after the said presser-device has been set for a uniform operation, the said presser-device may be lifted by, and simultaneously with, the ordinary presser-foot of the machine, by the usual presser-foot lifter; to provide means whereby a predetermined size of fold, plait, ruffle, or gather, may be produced and by which, during the operation of the machine and without affecting the stroke of the said ruffling means, the presser-device may be raised and lowered to decrease or increase its pressure upon the ruffling means for such purposes as completely eliminating the ruffling action momentarily, or for varying the depth or width of the fold, tuck, ruffle or gather without actually changing the stroke of the ruffling-device; to provide means whereby any predetermined length of stitching may be produced, and in combination therewith a device by means of which the stroke of the ruffler-blade, during the operation of the machine, may be varied or completely eliminated, so far as its ruffling function is concerned, without affecting the length of the stitch, or the operation of the stitching mechanism in any manner; to provide a combined ruffling and feeding mechanism having a compact arrangement whereby the ruffling device obtains its movements directly from the feeding mechanism and thus has, during the operation of the machine, the uniform motion of said feeding mechanism, in combination with a device by means of which, notwithstanding the constant motion of the combined ruffling and feeding mechanism, variations in the stroke of the ruffling device may be produced at the will of the operator and during the operation of the machine or, such strokes, for ruffling purposes, may be eliminated for any definite period, at the will of the operator; to provide means whereby the ruffling device or auxiliary feed may be adjusted, as to its stroke or throw, to any predetermined extent, together with means whereby, whatever may be the predetermined amount of throw given to the said ruffling device or auxiliary feed, the maximum of said throw will always be normally maintained and will be automatically resumed after any change from said maximum; to provide a mechanism by means of which ruffling, plaiting, fulling or stretching can be produced and the extent thereof regulated to a certain maximum, in combination with means whereby, whatever may be the character of the work produced, the same may be instantly eliminated, viz., a maximum of ruffling may be changed to plain work, or the fulling or stretching may be changed to ordinary feeding; to provide means whereby, in a machine of the character noted, the controlling devices will be under spring tension so as to prevent the operator from inadvertently overloading or bringing excessive pressure to bear upon the operating mechanism or the controlling mechanism and whereby also to eliminate all jar and vibration which might be transmitted from the rapidly operating parts of the machine through the controlling mechanism to the foot or knee of the operator; to provide means, in the connection stated, whereby the treadle or knee-shift of the machine will be normally held in a given position so that the operator is enabled to instantly find the same, so that pounding upon the operator's foot or knee is avoided, and so that vibration and rattling of the connecting chains, etc., between the treadle or knee-shift and the controlling mechanism, are eliminated; to provide means whereby both the feed of the machine and the rufflerblade, or the auxiliary feed, may be adjusted vertically to make more or less engagement with the work, or be projected more or less above the surface of the cloth-plate; to provide a machine which can be used interchangeably as a ruffling machine for operation upon white goods and other goods of inelastic character, whereby to produce ruffles, plaits and gathers, or as a machine for manipulating one or more pieces of work which are elastic and which have elasticity of different degrees, whereby to properly and perfectly control the application of one piece of elastic goods to another, such as in the collaret work as done on the wellknown Metropolitan collaret machine; and to provide means whereby, in combination with the interchangeable devices just referred to, attachments of various character may be applied to the machine whereby to manipulate one or more pieces of the work, whether white-goods, elastic or otherwise, thus enabling the machine in its interchangeable aspect to be adapted to many uses which now require many different kinds of machines, and, hence, enabling this machine to perform the work and take the place of many different varieties of machines which are now in use for the various purposes hereinabove noted.

With the above objects in view, and others which will be detailed during the course of this description, the invention consists in the parts, features, elements and combinations of elements hereinafter described and claimed.

Figure 2:
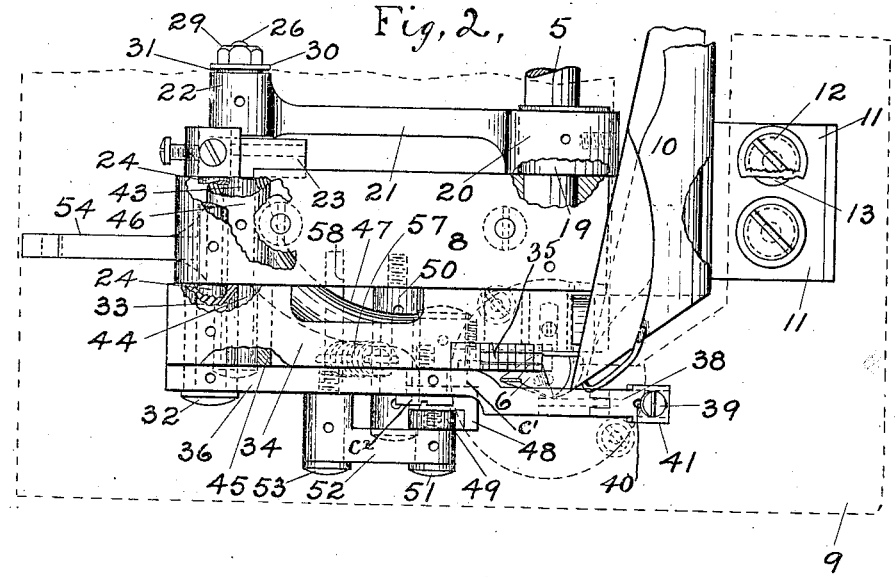
Figure 3:
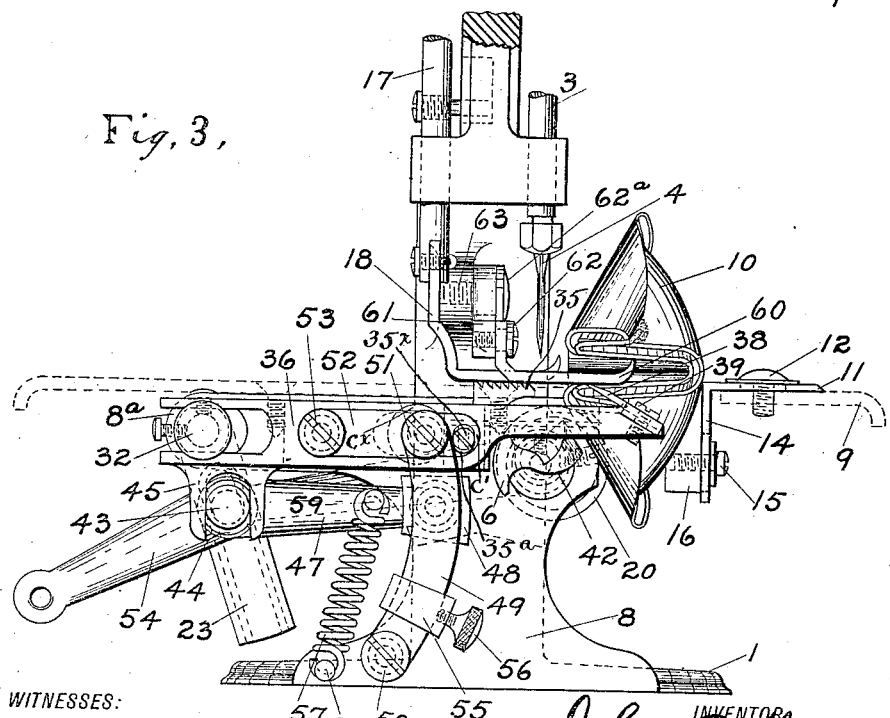

In the drawings forming part of this description: Figure 1 is a front elevation of a portion of a well-known type of sewing machine, the same showing my invention applied thereto in combination with a collaret folder of the Metropolitan type and showing the adaptation of the machine to collaret work; Fig. 2 is a top-plan view of the front end of the machine, the overhanging-arm being removed, the cloth-plate and throat-plate being shown in dotted outline, and certain parts being broken away to clearly show the construction of the differential or duplex feeding mechanism; Fig. 3 is a front end elevation of the machine, a portion of the head of the machine being shown in order to illustrate the coöperative relation of the needle, presser-foot, feed-dog, ruffler-blade, ruffler-foot, and folder, the cloth-plate of the machine being shown in dotted outline; Fig. 4 is a section on the line 4—4 of Fig. 5, looking toward the front of the machine, the presser-foot, etc., in this figure, being omitted, the view being intended to show merely the details of construction of the portion of the feed-actuating mechanism along the said line 4—4; Fig. 5 is a sectional view on the line 5—5 of Fig. 6, the same being intended to show the construction of the feed-actuating mechanism from the end opposite that of Fig. 3, this view also showing, in dotted lines, the application of an auxiliary feed-dog as a substitute for the ruffler-blade shown in the several figures; Fig. 6 is a rear elevation of the machine, a portion only of the frame of which is shown, the view being intended to illustrate the manner in which the auxiliary feeding device, or the ruffling-device, may be manipulated during the operation of the machine, together with the manner in which the ruffler-foot may be manipulated at will by the operator, without affecting the stitch-forming operations of the machine; Fig. 7 is a top-plan view of a portion of the rear end of the machine, the same illustrating the details of the ruffler-foot lifting mechanism; Fig. 8 is a top-plan of a portion of the front end of the machine, portions being broken away and the figure illustrating the means by which the auxiliary feed or the ruffler-blade may be manipulated during the operation of the machine; Fig. 9 is a front end elevation of a portion of the machine, parts being shown in section and other parts being broken away, the figure illustrating the manner in which the auxiliary feed, or the ruffler-blade, together with the ruffler-foot, may be manipulated during the operation of the machine, at the will of the operator and without affecting the stitching; Fig. 10 is an elevation showing the two connections between the treadles and levers 54 and 74, respectively; and Fig. 11 is an elevation showing the mode in which a single treadle may operate the said two levers, as suggested by the dotted-line construction in Fig. 6.

In order that the convertibility of the machine may be clearly understood, and when the machine is converted from a ruffling to a collaret machine, certain essential details should be understood and especially in connection with the character of the products produced by the machine. Hence, it should be understood that when the machine is equipped with a ruffling blade on the auxiliary bar, the machine produces what is technically known in the art as ruffling, gathering, plaiting, shirring and crimping and this product, in point of size, may be varied while the machine is in operation and without affecting the stitching and at the will of the operator; that is to say, with the machine set for a given size of ruffling, gathering, etc., variations from said size may be made at the will of the operator as described so as to produce a diminution of the ruffle, gather, etc., or so as to increase the size of the ruffle, gather, etc., or the ruffling of predetermined or any varying size can be produced and instantly eliminated so as to produce plain stitching and vice versa. On the other hand, when the machine is equipped with the auxiliary feed-dog as a substitute for the ruffler-blade or device, the machine will produce what is technically known as fulling or stretching, and variations in the amount of such fulling and stretching may be produced while the machine is running and without affecting the stitching, and at the will of the operator, in the same manner as above referred to in connection with the ruffling; and when the machine is set for a given amount of either fulling or stretching, the latter may be instantly eliminated at the will of the operator so as to produce no effect upon the work and permit perfectly plain stitching, or vice versa. The functions of ruffling, gathering, etc., are usually produced on what is known in the trade as white-goods, and the functions of fulling and stretching are produced in connection with what is known in the trade as knit-goods, the former not being elastic and the other being more or less elastic. The reason for the difference in functions of the two devices is that the ruffling-blade has a knife edge, usually serrated and arranged with the length of the edge transversely of the line of feed, and across the line of stitching, and said edge engages the work at a single point or along a single narrow line transversely of the feed or of the line of stitching and, in coöperation with the ruffler-foot, folds one portion of the fabric over upon another portion, thus producing a distinct ruffle, gather, etc. The fulling or stretching of the work, accomplished on knit or other stretchy or elastic goods, is produced with the auxiliary feed-dog which is more or less extensive, and engages several of the wales of the work and, in consequence, has a very material area of the work to operate upon; that is to say, the auxiliary feed-dog will ordinarily be arranged with its length parallel with the line of feed or the line of stitching and will be approximately one-half inch long and one-quarter inch wide, thus enabling it to engage a considerable area of the work and operate upon the same and manipulate it in such a manner as to either create a substantial drag so as to stretch the work either longitudinally or transversely of the wales, or, full the work by compressing the work either longitudinally or transversely of the wales so as to overcome normal stretching of the work in its passage through the machine or to compress the same to a greater degree than normal for a given purpose, such compression or stretching of the work, as the case may be, giving substantially no ripple to the surface of the work and, in consequence, being clearly distinguishable from ruffling, gathering, etc. The ruffling function of the machine is particularly useful in connection with the backs of shirts where it is common to place a bunch or cluster of ruffles, gathers, etc., at the shoulder-blade position or in the middle of the back, as well as in various other connections such as making ruching, making ruffles for skirts and in every other relation where a ruffled product is required; while the fulling and stretching functions of the machine are useful in the sewing of collarets to the neck openings of Balbriggan shirts, the application of a braid or binding-strip to knit-goods of all character, the sewing of one piece of stretchy or elastic goods to another which is more or less stretchy or elastic and, in fact, in all relations where it is necessary to apply one piece of material to another, one or both of which may be elastic and when it is required to control one piece in its application to the other. This clearly shows the dual character of the machine and will serve to accentuate the convertibility thereof.

In the drawings, the numeral 1 indicates the frame or head of the machine, the overhanging-arm 2 of which has the needle-bar 3 reciprocating therein, said needle-bar carrying the needle 4. The driving-shaft 5 of the machine carries at its forward end a chain-stitch looper 6 of any suitable form, that illustrated being of the rotary-hook type. The rotary driving-shaft 5 is supported in bearings 7 and 8 of the frame, the bearings 8 being shown as a standard at the forward end of the machine.

The cloth-plate of the machine is indicated by 9, the latter supporting at the front thereof, or in advance of the stitching position, a folder 10 of the form used on the Metropolitan collaret machine, for guiding, controlling and hemming the edges of a collaret for the purpose of applying the same to the neck-opening of French Balbriggan undershirts, said folder being supported in position by an angular attaching-plate, the horizontal portion 11 of which overlaps and is secured to the cloth-plate 9 through the medium of the screws 12, which are passed through enlarged holes 13 in the said overlapping portion 11 of the attaching-plate. This construction enables the folder to be adjusted toward and from the stitching position, as well as longitudinally of the cloth-plate. The enlarged holes 13 through which the screws 12 pass, the latter being tapped into the cloth-plate, permit, in fact, a universal adjustment of the said folder in a horizontal plane on the cloth-plate of the machine. The vertical portion 14 of the attaching-plate is secured by means of screws 15 passed through the same and tapped into a block or plate 16, suitably secured to the folder. Thus, the attaching-plate can be removed from the folder when it is desired to substitute a different size or form of folder, or other attachment for the one in use, and various obvious adjustments of said attachments can be secured.

The overhanging-arm of the machine, see Fig. 3, also supports in suitable bearings the presser-bar 17, which carries at its lower end the presser-foot 18, as usual, the same coöperating with the feed-dog 35, of the machine to carry the work through the machine past the stitching point.

The driving-shaft 5 carries an eccentric 19 surrounded by the enlarged strap 20 of the pitman 21, the rear end 22 of which is adjustably connected with the arm 23 of the rock-shaft 24, said connection being formed by means of the elongated pin 25, see Fig. 4, the outer end of which is reduced and screw-threaded, as at 26, and the inner end of which is provided with the flat head 27, sliding in the T-shaped slot or groove 28 of the said arm 23. The pin 25 is retained in adjusted position by causing its head 27 to bind in the groove 28 by drawing the same forcibly against the walls of the latter through the medium of the adjusting-nut 29 screwed upon the reduced end 26 of the pin 25, which presses against a washer 30, the latter, in turn, engaging the outer end of the eccentric bushing or sleeve 31 surrounding the smooth portion of the pin 25 and the inner end of which bushing engages the outer wall or surface of the rock-arm 23, thus securely clamping the pin 25 in any position to which the same may be moved along the groove 28 of the said rock-arm 23. The length of the bushing or sleeve 31 is slightly greater than the length of the end 22 of the pitman 21, thus giving to the pitman freedom of movement on the bushing 31 to prevent binding between the washer 30 and the outer surface of the rock-arm 23. The eccentricity of the bushing 31 is provided for the purpose of taking up any wear which may be caused from constant and rapid operation of the machine, such wear oftentimes changing the stroke of the feed. Through this connection, the rock-arm 23 is driven and motion is thereby imparted to the rock-shaft 24, the extent of the rocking movement of said shaft and the movement of said arm being regulated according to the position of the adjustable pin 25 in the groove 28 of the rock-arm 23. This adjustment is for controlling the movement of the main feed-dog and regulating the length of the stitch.

The shaft 24 is journaled in the rear end 8a of the standard 8 and extends through the same to the side opposite the rock-arm 23, said extended end terminating in a head 32. Surrounding this end of the shaft 24 is the bushing 33, and embracing the bushing is the bifurcated rear end of the main feed-bar 34 which is extended forward toward the stitching position and carries at its front end the main-feed-dog 35, which, as usual, may be adjustable vertically so as to have more or less projection above the cloth-plate of the machine, as by a slot 35a in the shank of the dog 35 and a screw 35x passing through said slot and tapped into said bar. See Fig. 3. Also embracing the said bushing 33, and between the adjacent end of the main feed-bar and the headed end 32 of the rock-shaft, is the bifurcated end of the auxiliary feed-bar 36, which extends forward to and in front of the stitching position and carries at its front end either an auxiliary feed-dog 37, shown by dotted lines in Fig. 5, or a ruffling-device 38, shown in full lines in the said figure. In either event, the auxiliary dog 37, or the ruffling-device 38 will be adjustable upon the forward end of the auxiliary feed-bar by means of the screw 39 which passes through an elongated slot 40 in the shank of the said dog or ruffling device and is tapped into the end of the auxiliary feed-bar, the sides 41 of the shank of said dog or ruffling-device being turned down at an angle, so as to embrace the end of the auxiliary bar, thus firmly retaining the dog or ruffling-blade in proper position, and constituting a guide by which the said dog or blade, when adjusted, may be maintained with its operating end or surface always in the same position. The adjustment of the dog or device on the end of the auxiliary bar is for the purpose of causing the same to be more or less projected through the cloth-plate in the operation of the machine to secure the proper engagement with the fabric for performing its function.

On the forward end of the driving-shaft 5, and between the standard 8 and the rotary hook 6 an eccentric 42 is suitably secured in place, see Figs. 1 and 3 the forward end of the main feed-bar resting on a shoe a, carrying a strap a' surrounding said eccentric and the latter giving to the feed-bar its vertical movements to carry the feed-dog 35 into and out of engagement with the work and thus causing the feed-dog 35 to coöperate with the presser-foot 18 to feed the work through the machine and past the stitching position. The parts a and a' are shown only in dotted lines in Figs. 3 and 5 and are no part of this invention. The main feed-bar also has a depending forked lug 45, embracing a bushing 44, carried by the pin 43 fixed to the rear side of the rocking-arm 23, which pin affords a journal for the bearing 46 of a driving and controlling lever. The train of mechanism just described, through the medium of the eccentric 19, obviously, imparts to the main feed-bar its longitudinal movements by which the feed-stroke is given and the adjustments regulate the length of stitch. The auxiliary feed-bar is given its longitudinal movements, for the purpose of imparting the ruffling stroke to the ruffling-device 38, or the feeding stroke to the auxiliary dog 37, through the medium of the mechanism just described, since the forward arm 47 of the said driving and controlling lever is provided with the shoe 48 embracing the curved lever 49 fulcrumed at 50 to the standard 8 of the machine, the upper end of the lever 49 being pivoted at 51 to the link 52 which, in turn, is pivoted at 53 to the side of the auxiliary feed-bar 36. This mechanism, in addition to imparting the longitudinal movements to the auxiliary bar 36, also enables the stroke of the latter to be regulated during the operation of the machine and without affecting the stitching of the latter. That is to say, by manipulating the rearwardly extending arm 54 of the bell-crank lever, the forward arm 47 thereof may be caused to slide on the lever 49 toward and from its fulcrum 50, thus regulating the amount of throw imparted by the rocking-arm 23 through the medium of its connections to the eccentric 19 on the driving-shaft 5. Normally, the bell-crank driving and controlling lever is held with its arm 47 depressed and shoe 48 in engagement with a stop 55 adjustable by means of the set-screw 56 upon the lever 49, the normal engagement being secured by means of the coiled-spring 57, secured at one end to the base of the standard 8 by the pin 58, and at its opposite end to the arm 47 of the driving and controlling lever by means of the pin 59. In Fig. 3 of the drawings, the driving and controlling lever is supposed to be moved to nearly its upward extreme so as to produce a short stroke of the auxiliary feed-bar 36, the same position being shown in Fig. 5, but in the latter figure the normal position being shown in dotted outline. Obviously, by adjusting the stop 55 on the lever 49, a certain throw of the auxiliary feed-bar can be maintained as its normal stroke, and any variation from its normal stroke would be produced by depressing the arm 54, as hereinafter described. Thus, the auxiliary bar may be given any degree of stroke found desirable and, during the operation of the machine and without affecting the stitching operation, the stroke or movement of said bar can be regulated by manipulating the controlling lever by running the shoe 48 up and down on the lever 49, the spring always exercising a normal tendency to return said lever to the normal, dotted-line position of Fig. 5.

As shown in Fig. 9, the adjustable stop 55 may be arranged above the shoe 48, instead of below the same, as in Fig. 3, thus the spring 57 will normally operate to maintain the shoe 48 at the lowest point possible on the lever 49, or at the nearest point possible to its fulcrum 50. By adjusting the stop 55 above the shoe 48 on the lever 49, a certain predetermined reduction in extent of movement of the auxiliary bar 36 can be obtained instantly by manipulating the controlling lever through the medium of its arm 54, and this minimum stroke, according to the adjustment of the stop 55, can be obtained during the operation of the machine and without affecting the stitching of the latter. By this disposition of the stop 55, the operator can also, during the operation of the machine, obtain two predetermined extremes of adjustment or throw of the auxiliary bar, inasmuch as the spring 57, the moment the controlling lever is released, will instantly return the shoe 48 to its low, normal position. Moreover, the operator can, during the operation of the machine, and without affecting the stitching of the latter, obtain intermediate adjustments of the stroke of the auxiliary bar 36 by moving the shoe 48 up and down on the lever 49 at will between the stop 55, according to its position as in Fig. 3, and the pivotal connection 51 of the lever 49, or with the adjustment of the stop as in Fig. 9, by moving the said shoe 48 up and down on the lever 49 between the pivotal point 50 of the lever and the adjustable stop 55. These several adjustments render it possible to get all kinds of variations in the action of the auxiliary bar, whereby varying widths of ruffles or gathers may be produced, or varying strokes of the auxiliary feed-dog may be produced for the purpose of regulating the degree of fulling performed upon the work; and, having a predetermined stroke of the ruffler-device or auxiliary feed-dog constituting either its minimum or maximum of movement, said stroke can be varied either so as to produce a gradually diminishing movement of the auxiliary bar, or a gradually increasing movement of the auxiliary bar, and also having a predetermined movement of the bar, which may be either its minimum or maximum stroke, a second predetermined degree of movement may be produced instantly by manipulating the controlling lever according to the adjustment of the stop 55. These are important advantages and upon them great stress is laid, as they constitute valuable advances in the art and important features of my invention.

In order that the eccentric 42 may be utilized to impart the vertical rise and fall to the auxiliary feed-bar in the same manner as to the main feed-bar, the latter has driven into its side a screw $c^x$, the shank of which passes through an elongated slot $c'$, in the auxiliary feed-bar and the head of which acts as a guide to prevent the auxiliary feed-bar from moving laterally relatively to the main feed-bar. Thus the two feed-bars are caused to have their up and down movements in unison from a single common eccentric. It will now be noted, viewing Figs. 2 and 3 particularly, that the main feed-dog operates on the right and in the rear of the needle or stitching point and constitutes the means, in combination with the presser-foot 18, by which fabric is fed through the machine and past the stitching point, while the auxiliary dog 37, or the ruffling-device or blade 38, operates on the left and in advance of the stitching point and constitute the means, in combination with the ruffler-foot, by which fabric is fulled or stretched, or ruffled, etc. Hence, the main feed-dog operates on the work and on the binding applied thereto, if the work is being bound, while the auxiliary dog, or the ruffling-device, operates upon only one portion of the work and, especially, not upon the binding. However, in cases where two pieces of superposed material are being stitched together, irrespective of what they may be, the auxiliary dog or ruffling-device will operate upon the particular material which is being passed between the same and the ruffler-foot; and, according to the stroke of the auxiliary bar, the material operated upon will be either ruffled, gathered, etc., or will be fulled as the operator desires.

Coöperating with either the ruffling-blade or device, or the auxiliary dog, is the ruffler-foot 60, fixed by its shank to the forward end of the presser-lever 61, by means of the screws 62, the connection being such as to give to the foot some flexibility on the said screw 62 as an axis. The presser-lever 61 is pivoted at 62ª to an ear 63 secured to the machine frame. Normally, the lever 61 is depressed by means of the spring 66 hooked into the lever 61 at one end and into a lug 67, or fixed portion of the bed of the machine.

Now viewing Figs. 6, 7, 8, 9, 10 and 11 the means for controlling the stroke of the auxiliary bar 36 and for manipulating the presser-lever 61, for the various purposes outlined above in the statement of the objects of the invention, will be readily understood. In these figures, a spring 68 is hooked into the outer end of the arm 54, which is provided with an aperture 69 for the purpose, said spring being connected to the upper end of a chain 70, the lower end of which is connected either to a knee-shift mechanism, or a treadle, both of which are well-known in the art, and the treadle only being herein illustrated and described. By interposing the spring 68 between the treadle or knee-shift chain or connection and the operating end 54 of the controlling lever, the pressure applied to either the knee-shift or the treadle will be transmitted to the arm 54 gradually and yieldingly, instead of forcibly and by jerks. This is an important feature, inasmuch as an operator will often suddenly strike the treadle or knee-shift in an endeavor to make a quick movement of the controlling-lever and, in so doing, will jam the sliding-shoe with great force against the adjustable stop or other rigid part of the mechanism, thus making a noise and possibly injuring the mechanism. By interposing the spring, as described, the operator may quickly move his foot or knee and get a quick response from the controlling-lever but, at the same time, the pressure brought to bear will be yielding and positive rather than forcible, although, it will be understood, the spring is strong enough and has sufficient tension to make the controlling lever immediately and readily respond to the action of the knee or foot and operate in substantially a positive manner, the expression positive, in this connection, being in contra-distinction to forcible, as above used. Thus, it will be seen that, by moving either the knee or foot, the operator may run the shoe 48 up and down on the lever 49 to any extent or degree desired, in order to get any extent or degree of movement of the auxiliary feed-bar 36 which may be required. And it will also be understood that this manipulation is possible during the operation of the machine, and without affecting the stitching of the latter, it being the object of my invention, through this mechanism, to manipulate the auxiliary bar 36, while the machine is running at full, or any speed to get various and sundry effects upon the work, as above noted in the statement of the objects of the invention. At the rear of the frame or head of the machine, a bracket 64 is secured by means of screws 65, said bracket being provided with the extended portion 71, to which is pivoted at 72 a presser-controlling lever, the forward arm 73 of which extends under the presser-lever 61 at a point a short distance from the fulcrum 62ª of the latter, said forward arm 73 being normally maintained in engagement with said lever 61 through the medium of the weight of the rearwardly extending arm 74 of said presser-controlling lever, coupled with the weight of the spring 75 and chain 76, which latter also extends down to a knee-shift or treadle mechanism independent of the knee-shift or treadle mechanism connected to the chain 70 of the feed-controlling lever. Obviously, this weight, creating pressure of the lever arm 73 upon the lever 61, has no tendency to raise the presser 60 out of coöperation with the auxiliary dog or feeding-device, but merely maintains said lever-arm 73 in proper engagement with the lever 61 for instant operation, whereby the latter may be readily lifted at the will of the operator. The spring 75 is hooked into an aperture 77 in the arm 74 of the presser-controlling lever, as will be clearly understood. Instead of having two independent knee-shifts or treadle mechanisms, one for controlling the mechanism through the chain 70 and the other for controlling the mechanism through the chain 76, a single, common knee-shift or treadle mechanism may be employed and connected directly with both the chains 70 and 76 through the medium of the chain 78, which will be directly connected to either the knee-shift mechanism or treadle device and the branch-chain 79 extending to the chain 70 and the branch-chain 80 extending to the chain 76. See Figs. 6 and 11. In this manner both the auxiliary bar 36 and the presser-lever 61 may be directly under the control of the operator through the medium of a single knee-shift or treadle. The spring 75 operates in precisely the manner described above in connection with the spring 68 when brought into play and action by the operator through the medium of either the knee-shift or treadle mechanisms. For the purpose of limiting the elevation of the ruffler-foot 60, the presser-controlling lever is provided with the depending lug 81, through which is tapped an adjusting-screw 82 with the shank of which coöperates the set nut 83 for cooperation also with the depending-lug 81. The forward end of the screw 82 is set so as to contact with the stop 84, forming part of the bracket 64 and being an extension thereof, as will be readily understood upon viewing Figs. 6, 7 and 9. This disposition of the adjusting-screw enables a limit to be put upon the movement of the controlling-lever 74, so as to prevent the foot 60 from being lifted too high, and said screw may be so set as to contact, after a certain short movement, with the stop 84 so as to make the lift of the foot vary the action of the auxiliary feed-dog or ruffling-device; that is to say, aside from adjusting the throw of the auxiliary bar 36, so as to vary and regulate the action of the ruffler-device or auxiliary dog on the work, the ruffler-foot may be lifted to a certain predetermined degree or extent, so as to change the coöperative action of the same and the ruffler-device or auxiliary dog on the work. In other words, the ruffle, gather, etc., may be produced by varying the stroke of the auxiliary bar 36, and if the auxiliary dog is in use, the degree of fulling of the work may be varied in the same manner; or, instead of regulating the throw of the auxiliary bar 33, the action of either the ruffling-device, or the auxiliary dog on the work can be controlled by raising or lowering the presser 60 more or less into coöperative action with the work and said ruffling-device or auxiliary dog. And it will be obvious that, if the pressure of the foot 60 on the work is diminished, the action of the auxiliary dog or ruffling-device on the work will be changed, and this change will be varied to the extent that the pressure of the foot 60 on the work is increased or diminished. Thus, I have, in this machine, two distinct means for controlling the character of work of the machine, one by regulating the pressure of the foot 60 on the work, thus changing or modifying the coöperative action of said foot and ruffler-device or auxiliary dog on the work, and the other by varying and controlling the stroke of the auxiliary bar 36, as previously described. And these changes in the character of the work of the machine may be brought about through the medium of either mechanism by simply manipulating the knee-shift or foot-treadle, during the operation of the machine and without affecting the stitching of the latter, inasmuch as all the variations are produced and all manipulations of the work are brought about and performed in advance of the stitching position and while the work is being passed through the machine by the main feed-dog 35 and its coöperating foot 18. It may also be found desirable to set the screw 82 so that the presser-controlling lever cannot be operated, leaving the presser-lever 61 to create substantially its normal pressure through the foot 60 on the work in coöperation with either the ruffling-device, or the auxiliary feed-dog. With this condition of the parts, it will be obvious that the operator may control and vary the action of the auxiliary bar 36 through the medium of the foot-treadle or knee-shift, and the chains 78, 79 and 70, without affecting the presser-controlling mechanism through the medium of the chains 80 and 76, the only action on the latter chains being to cause them to stretch or distend the spring 75 without affecting the presser-controlling lever. This adjustment of the parts and operation of the machine may often be found desirable.

Having thus described the details of my invention, it will be readily understood that, in addition to the advantages set forth in the statement of the objects of the invention, the following are important: Accordingly as the auxiliary bar 36 carries a ruffling-device or an auxiliary-dog, the machine is capable of producing ruffling, gathering, plaiting, crimping, fulling or stretching of one piece of work relatively to or on another, and the amount of ruffling, gathering, fulling, etc., may be regulated according to the desire of the operator, or as the demands of a given piece of work may require, and such regulation may be produced at the will of the operator and during the running of the machine at any speed and without affecting the stitching of the latter; the controlling mechanism is accessibly presented to the operator through the medium of the knee-shift or foot-treadle and is always under his control so that he may instantly bring about the changes and variations desired or required; the machine is convertible into a collaret machine or a back-ruffling machine, and many variations in the character of the work may be produced according to the character of the attachment applied to the cloth-plate of the machine in place of the folder 10; that is, ordinary binding may be produced upon one or more pieces of fabric, or a collaret may be applied as heretofore described, or a ruffle may be applied to the work, which latter may be either white or elastic goods, or two pieces of work may be sewed together and fulled or stretched according to the requirements of the effects desired; variations in the ruffling, gathering, fulling or stretching may be produced at the will of the operator and, while the machine is at full speed, predetermined extremes of the several effects may be produced in the same manner and under the same conditions; the foot, which coöperates with the ruffling-device or auxiliary-dog, may be lifted from the work simultaneously with the elimination of the ruffling-stroke of the ruffling-device, or fulling-stroke of the auxiliary feed- dog, so that the slow movement of the said dog or device, corresponding with the speed and movement of the main feed-dog will have no effect upon the work because its coöperating member has been lifted from the latter, this being an important feature and advantage of the invention because, if the ruffler-foot 60 were allowed to remain in contact with the work, the auxiliary dog would stretch the work and the ruffling-device might have an objectionable action upon the work, especially where the latter is very light, such action being the constant whipping of the work during the rapid running of the machine; the adjustable stops and their disposition enable various important functions to be performed, as heretofore set forth, and give to the machine new possibilities of operations and functions; and, the throw of the main feed-bar can be regulated independently of the regulation of the auxiliary feed-bar, thus enabling any desired throw of the main feed-bar to be secured for a given length of stitch without changing the relative movement of the auxiliary feed-bar, or, without changing the throw of the main feed-bar, the throw of the auxiliary feed-bar can be varied at the will of operator, during the running of the machine and without affecting the stitching operation.

It will be noted that throughout the specification I have made a distinction between the functions of the ruffling-device and the auxiliary feed-dog and desire to accentuate this difference in function as it marks the convertibility of the machine; and the radical difference in the appearance of the work, irrespective of the size of the ruffles or gathers, or the amount of the fulling or stretching produced, is the direct result of the two different devices. This shows the versatility of the machine and accentuates its convertible character and suggests the many different possibilities of the machine when provided with the duplex controlling mechanism, as well as the duplex feeding mechanism described, and also accentuates the many advantages of my machine, as above set forth.

Having thus described my invention, what I claim and desire to secure by Letters Patent is:

1. In combination, stitch-forming mechanism, feeding mechanism comprising a main and an auxiliary feed-bar, means whereby the latter bar may carry either a ruffling device or a feed-dog, and treadle-operated means under the control of the operator for modifying the action of the auxiliary bar without stopping or retarding the action of the stitch-forming mechanism, and without varying the stroke of the main feed-bar, substantially as described.

2. In combination, stitch-forming mechanism, a feeding mechanism comprising a main and an auxiliary bar, means whereby a ruffling device and a feed-dog may be interchangeably connected to the auxiliary bar, and means under the control of the operator whereby the movement of the auxiliary bar can be made greater than that of the main bar during the operation of the machine and without stopping or retarding the action of the stitch-forming mechanism and without varying the action of the main feed-bar.

3. In combination, a stitch-forming mechanism, a feeding mechanism including main and auxiliary bars independent of each other and arranged in parallelism, means for raising and lowering said bars simultaneously, means for giving said bars independent feed movements, including a treadle-operated controlling device coöperating with the auxiliary bar for modifying the action of the latter during the operation of the machine and without affecting the stitching action thereof, or varying the stroke of the main feed-bar.

4. In combination, a stitch-forming mechanism, a feeding mechanism comprising a main and an auxiliary bar, the latter being independent of but arranged in parallelism with the main bar, common means for raising and lowering said bars, common means for imparting longitudinal movements to said bars, the latter including treadle-operated means whereby, during the operation of the machine and without affecting the stitching action thereof, the auxiliary bar may be controlled at the will of the operator without the intervention of the hands of the latter, and without varying the action of the main feed-bar.

5. In combination, stitch-forming mechanism, feeding mechanism including independent main and auxiliary feed-bars arranged in parallelism, means for imparting the rise and fall to said bars, means for imparting the longitudinal movements to said bars, including a treadle-operated controlling means for controlling the action of the auxiliary bar during the operation of the machine and without affecting the stitching action thereof, and without varying the stroke of the main feed-bar.

6. In combination, stitch-forming mechanism, feeding mechanism, including a main and an auxiliary feed-bar supported to operate side by side, the main bar carrying a feed-dog and the auxiliary bar carrying an auxiliary device, a presser-foot coöperating with the main dog in rear of the needle in the line of feed, and a ruffler-foot for coöperating with the device carried by the auxiliary bar in advance of the needle, and means for controlling the action of the auxiliary bar during the operation of the machine including a lever mounted on a movable fulcrum and a curved lever connecting the same with said auxiliary bar.

7. A feeding mechanism having, in combination, a main feed-bar and an auxiliary bar, the latter carrying an auxiliary device, means for actuating the feed-bars, controlling means including a curved lever linked to the auxiliary bar and a swinging lever accessibly presented to the operator whereby, during the operation of the machine, the action of the auxiliary bar may be modified, and means for coöperating with the device carried by the auxiliary bar and connected with the controlling means so as to be under the control of the operator during the running of the machine.

8. A feeding mechanism having, in combination, a main feed-bar carrying a dog, an auxiliary feed-bar carrying an auxiliary device, means for actuating said bars, a presser-foot coöperating with the main feed-dog, a ruffler-foot for coöperating with the device carried by the auxiliary bar, and means coöperating with the auxiliary bar for modifying its action, and a connection between said latter means and the ruffler-foot whereby the position of the latter may be controlled.

9. In combination in a feeding mechanism, a main and an auxiliary feed-bar, a feed-dog carried by the main bar, and a device carried by the auxiliary bar, a foot coöperating with said device, treadle-operated means for controlling the action of said auxiliary bar and connected means for controlling the position of said foot.

10. In combination in a feeding mechanism, a main and an auxiliary feed-bar, a feed-dog carried by the main bar and the auxiliary feed-bar carrying a detachable device, means for actuating the two bars, a foot coöperating with said device, means yieldingly forcing said foot normally into coöperative relation with said device, and treadle-operated means for connecting the foot and the device and for controlling the coöperative action of the two.

11. In combination in a feeding mechanism, a bar carrying a device, means for actuating the said bar including a controlling device accessibly presented to the operator whereby the action of the said bar may be controlled during the operation of the machine, a foot coöperating with said device, a controlling device accessibly presented to the operator whereby the action of said foot may be controlled during the operation of the machine, and treadle-operated means connecting said two controlling devices for controlling the coöperative action of said foot and said device.

12. In combination in a feeding mechanism, a reciprocating bar carrying a device below the cloth-plate, means for actuating the same including a lever, a foot coöperating with said device above the cloth-plate, a lever coöperating with said foot, and a controlling means, accessibly presented to the operator connected with both of said levers, whereby the operator may control, during the operation of the machine, both the foot and said device.

13. In combination in a feeding mechanism, a bar carrying a device, a foot coöperating with said device, a lever coöperating with said foot, an adjustable stop carried by said lever, means for actuating said bar, and means, under the control of the operator, connected with said actuating means and with said lever whereby the foot and bar may be controlled during the running of the machine.

14. A feeding mechanism having in combination, a driving shaft, an eccentric carried thereby, a strap connected to said eccentric, a rock-shaft, an arm carried thereby, means for connecting and adjusting the strap to and along said arm, a main feed-bar and an auxiliary feed-bar mounted side by side, means for connecting said bars with said rock-shaft, and means for controlling the action of said auxiliary bar independently of said adjusting means.

15. In combination in a feeding mechanism, a main feed-bar and an independent auxiliary feed-bar arranged in parallelism, a driving-shaft, means for actuating said bars including a rocking arm, an adjustable connection between said arm and the driving-shaft, and a controlling-device independent of the adjustable connection connecting said arm with the auxiliary bar whereby the motion of the arm imparted by the driving-shaft may be modified in the auxiliary bar without varying the action of the main feed-bar.

16. In combination in a feeding mechanism, a main feed-bar and an independent auxiliary feed-bar arranged in parallelism, a driving-shaft, a rocking-arm, an adjustable connection between the driving-shaft and said arm, a driving connection between the main feed-bar and said arm, a driving connection between said arm and the auxiliary feed-bar, said latter driving connection including a controlling lever, with connections accessibly presented to the operator whereby, during the running of the machine, the action of the auxiliary bar may be modified.

17. A feeding mechanism having, in combination, a main and an auxiliary feed-bar, common means for actuating the main bar and the auxiliary bar, means for adjusting the movement of the main bar, adjusting means for varying the stroke of the auxiliary bar, and means including a link pivotally connected to said auxiliary bar and to a member of said adjusting means, and means arranged accessibly to the operator and connecting with said adjusting means whereby, during the operation of the machine and without varying the stroke of the main feed bar, the stroke of the auxiliary bar may be varied.

In testimony whereof, I have signed my name to this specification in the presence of two subscribing witnesses, this twentieth day of June 1906.

JOHN P. WEIS.

Witnesses:
W. J. REED,
F. D. SHEEKEY.